United States Patent [19]

Barley

[11] Patent Number: 4,494,794
[45] Date of Patent: Jan. 22, 1985

[54] VEHICLE SEATS

[75] Inventor: Geoffrey W. Barley, Kislingbury, England

[73] Assignee: UOP Inc., Des Plaines, Ill.

[21] Appl. No.: 39,636

[22] Filed: May 16, 1979

[30] Foreign Application Priority Data

Mar. 12, 1979 [GB] United Kingdom ............... 7908540

[51] Int. Cl.$^3$ .............................................. A47C 3/00
[52] U.S. Cl. .................................................. 297/307
[58] Field of Search ............... 248/564, 575, 588, 608, 248/567; 297/307–309, 306

[56] References Cited

U.S. PATENT DOCUMENTS

| | | | |
|---|---|---|---|
| 1,565,054 | 12/1925 | Brunker et al. | 248/564 |
| 2,840,140 | 6/1958 | Harrington | 248/567 |
| 3,109,621 | 11/1963 | Simms et al. | 248/564 |
| 3,356,413 | 12/1967 | Radke et al. | 248/567 |
| 3,567,279 | 3/1971 | Hall et al. | 297/309 |
| 3,711,149 | 1/1973 | Carter | 297/307 |
| 3,788,697 | 1/1974 | Barton et al. | 297/307 |
| 3,913,975 | 10/1975 | Carter | 248/567 |
| 4,074,886 | 2/1978 | Yates | 248/588 |
| 4,153,295 | 5/1979 | Boulanger et al. | 297/307 |

Primary Examiner—Francis K. Zugel
Attorney, Agent, or Firm—James R. Hoatson, Jr.; Barry L. Clark; William H. Page, II

[57] ABSTRACT

This invention relates to a vehicle seat of the type in which a seat part is supported and guided for upward and downward movement relative to a base part by a spring suspension.

In order to avoid loss of contact between the feet of the seat occupant and control pedals of the vehicle, the suspension includes linkages connecting the seat part to the base part for relative movement such that the seat occupant's ankles remain stationary whereas his knees swing about an axis through his ankles.

11 Claims, 14 Drawing Figures

VEHICLE SEATS

BACKGROUND OF THE INVENTION

This invention relates to vehicle seats of the type in which a seat part (normally comprising a seat rest and a back rest) is supported and guided for upward and downward movement relative to a base part by means of a spring suspension. The suspension includes spring means capable of counterbalancing the load of the seat part and its occupant so that the seat part, under static conditions, is located at a mid-ride position substantially midway between UP-stop and DOWN-stop positions. Said spring means can comprise any means of taking up, storing and giving out energy so that the seat and its occupant can oscillate between the UP-stop and DOWN-stop positions when subjected to external forces.

Such a vehicle seat assists in isolating the occupant from vibrations transmitted from the vehicle wheels, particularly as the vehicle passes over rough terrain. However, the necessary freedom of the seat part to move up and down carries with it the danger, in the case of a driver's seat, of the driver's feet losing correct contact with the control pedals.

Previous attempts to overcome this difficulty have largely been based on the concept that the seat part of a suspension seat should move pivotally about a horizontal axis through the knee-hinges of the driver, since if such a knee-hinge axis (sometimes referred to herein as the K axis) is fixed relative to the base part of the seat, the lower leg, and hence the ankles, of the driver can remain stationary irrespective of the movements of the seat. However, if the seat rest and back rest of a seat part move in this way, the driver's back inclination will vary with rise and fall of the seat. This difficulty can be overcome by incorporating a linkage to change the inclination of the back rest with changes in the inclination of the seat rest. An example of a suspension seat designed in this way is found in British Patent Specification No. 1,156,942.

Such suspension seats have the disadvantage of a relatively large fore and aft movement of the entire part of the driver's body above his hip (H axis) since the knee hinge axis is the axis about which the seat rest and the hip region of his body must swing.

The present invention is based on the realisation that if a suspension seat can be designed to move in such a way that the seat occupant's lower leg will move about a horizontal transverse axis through the occupant's ankle hinges (A axis), the knee hinge axis accordingly being free to swing about the ankle hinge axis, such a seat will afford the driver a high degree of control over the vehicle over a wide range of seat movement. Moreover, it is found that a seat movable in this way affords a high degree of comfort to the driver.

Accordingly an object of the invention is to provide a suspension seat capable of moving the seat occupant's lower leg about a horizontal transverse axis through his ankle hinges, at the same time causing the seat occupant's back to move up and down with the back rest of the seat at a substantially constant inclination to the vertical. References herein to 'the vertical' assume the vehicle to be on horizontal ground.

This object is achieved by the provision of a vehicle seat comprising a seat part, which includes a seat rest and a back rest, and a base part, the back rest being supported by a spring suspension which is effective to restrict movement of the back rest to a substantially vertical direction, the suspension including means connecting the seat rest to the back rest for movement about at least two horizontal transverse axes through instantaneous centres of rotation, said centres being the instantaneous centres of rotation of the thigh of a seat occupant relative to any two parts of the seat which move relative to each other during upward and downward movement of the seat part relative to the base part, the thigh of the seat occupant being movable longitudinally and pivotally in such a way that the ankle hinge axis of the seat occupant remains stationary relative to the base part. The reason why such a construction achieves the object of the invention will be explained later.

The present invention also provides a vehicle seat comprising a seat part having a seat frame mounted for upward and downward movement relative to a base part by means of a spring-biassed scissor-action suspension (as defined) the linkage arms of the suspension being arranged to effect upward and downward movement of the seat frame substantially without tilting movement, the seat part further having a seat pan for supporting a seat cushion, the seat pan having pivot connections to the seat suspension such that during upward and downward movement of the seat, movement of the rearward part of the seat pan takes place in an upward and downward direction such that the movement of the H axis is vertical, and the seat pan tilts to cause the K axis to move along an arc permitting the A axis to remain stationary, the H, K and A axes being as herein defined.

By the expression 'scissor-action suspension' is meant a suspension which comprises a pair of rigid links having a common pivot connection in the manner of a pair of scissors, or a plurality of pairs of such links having a common pivot axis, one end of each link of the or each pair having a pivot connection to a seat part of the seat and the opposite end of each link of the pair having a pivot connection to the base part of the seat, the axes of the pivot connections all being parallel to one another, some of the pivot connections being fixed pivot connections but the other being sliding or rolling connections sufficient to give freedom of movement to the suspension in a substantially vertical direction only, an example being described in U.S. Pat. No. 3,109,621.

BRIEF SUMMARY OF THE DRAWINGS

FIG. 8 and FIG. 2A utilising the same instantaneous centres of rotation;

DESCRIPTION OF PREFERRED EMBODIMENTS

In each of the drawings, the seat part is shown to be supported by links lying in the plane of the drawing, and normally a second set of links or more than two sets of links of the same construction will be located in parallel relationship to the first set of links in order to provide stable support for the seat part. However it will be appreciated that if the single set of links appearing in the plane of the drawing can be provided with adequate depth in a direction perpendicular to the plane of the drawing, only one such set of links may be needed to provide adequate support.

Before describing the invention in detail, it is necessary to consider the basic design concepts of a seat for achieving the object of the invention. In order to achieve rise and fall of the driver's back without variation of its inclination, it will normally be necessary to adopt one of three well-known basic seat suspension designs. For convenience these will be referred to as types A, B and C in which:

Type A provides a back rest mounted on a seat frame, the seat frame being guided for vertical movement by a system of scissor-action linkages, such as are described in detail in U.S. Pat. No. 3,109,621 and shown in FIG. 1 of the drawings accompanying the present Specification.

Type B provides a back rest which is mounted for upward and downward sliding movement on one or more supports extending upwardly from the base part substantially vertically and located behind the back rest.

Type C provides a back rest which is connected by a parallelogram linkage system to a support upstanding from the base part, the links of the system being horizontal or at an angle to the horizontal sufficiently small to minimise fore and aft movement of the back rest with rise and fall of the seat. An example of such a suspension can be seen in U.S. Pat. No. 3,788,697.

Since, in accordance with the invention, the seat rest must rise and fall as the back rest rises and falls, but with a desired relative movement between the seat rest and back rest to maintain the A axis stationary, the means for achieving this movement of the seat rest will utilise as much as possible of the Type A, B or C suspension means on which the back rest is supported, but with additional supporting means to effect said desired relative movement. If however a Type B suspension is employed to support the back rest, the means for supporting the seat rest can conveniently include a Type A or Type C suspension or parts thereof.

It is now necessary to consider the way in which a driver's body will move in relation to the parts of such suspension in order to achieve the objective of the invention. Use will be made in this connection of the Method of Instantaneous Centres of Rotation in considering the movement of the upper leg or thigh of the seat occupant relative to the parts of the suspension.

It is considered, in this connection, that the thigh of the seat occupant extends between point K, which is the knee hinge, and point H which is either the hip joint or preferably a point (sometimes referred to as PPP meaning "preferred pivot point") which is somewhat behind the true hip joint. This is the point about which the thigh effectively rotates as it rocks with the seat rest. It is assumed that point H is relatively stationary with respect to the seat frame.

It should be borne in mind (1) that the Method of Instantaneous Centres of Rotation is based on the concept that any displacement of a body, movable in a plane, between two positions may be considered as a purely rotational movement about some centre;

(2) that the centre of rotation of a first link of a mechanism relative to a second link of the mechanism to which it is pivoted lies at the pivot;

(3) that the centre of rotation of a body having linear movement lies at infinity on a line perpendicular to the direction of movement and (4) that if the instantaneous centre of rotation of any part x relative to any part y is defined as the point $I_{xy}$ then if the mechanism has relatively moving parts a, b, c and d, the instantaneous centre $I_{a.d.}$ is at the intersection of the line connecting $I_{a.b.}$ and $I_{b.d.}$ with the line connecting $I_{a.c.}$ and $I_{c.d.}$.

Figure 1:
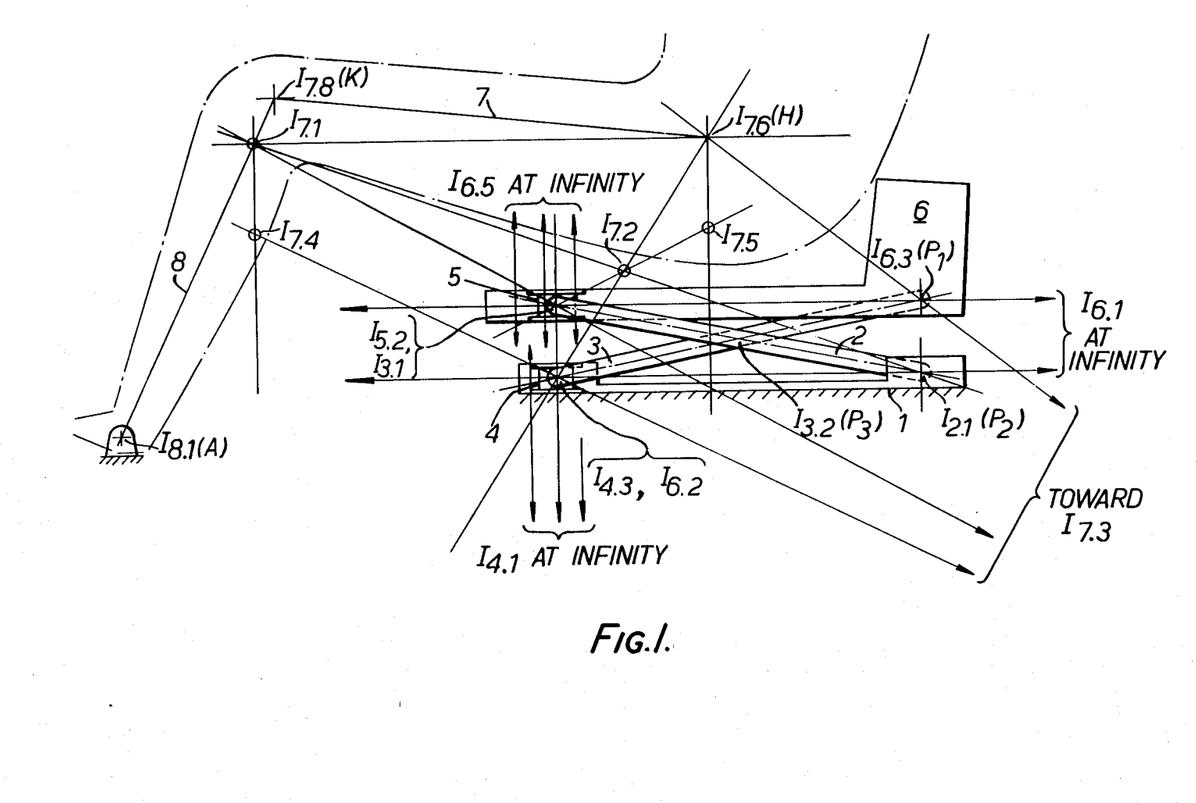
FIG. 1 is a diagrammatic representation of a vehicle seat suspension of the scissor-action linkage type formed by two transversely spaced pairs of crossed arm linkages having common pivotal axes to the base part, to the seat part and to each other, and showing the instantaneous centres of rotation of the moving parts of the suspension and of links representing the upper and lower leg portions of a seat occupant.

Considering first the A type suspension, shown in FIG. 1, this will be seen to comprise a base part 1, and two pairs of scissor links spaced transversely of the seat, only one being visible, this pair consisting of first and second links 2, 3. Link 3 is connected at its forward end by a roller or slider 4 to the base part 1 and by a fixed pivot $P_1$ at its rearward end to a seat frame 6. Link 2 is connected at its forward end by a roller or slider 5 to the seat frame 6 and by a fixed pivot $P_2$ at its rearward end to the base part 1. Links 2 and 3 have a pivotal interconnection $P_3$ at their intersection. The upper leg or thigh of the seat occupant will be looked upon as a link 7, and the lower leg as a link 8 pivoted at the ankle hinge point A to the floor, and thus to the base part 1. Point H is regarded as fixed relative to frame 6.

It will readily be seen from concept (2) above that the instantaneous centres $I_{2.1}$, $I_{4.3}$, $I_{6.3}$, $I_{5.2}$ and $I_{3.2}$ are established at the pivot points of the respective parts of the suspension. Similarly from concept (3) above, it will be seen that instantaneous centres $I_{6.5}$ and $I_{4.1}$ will be at infinity on lines perpendicular to the respective guide tracks of sliders 5 or 4, or at the point of contact of guide track and rollers 5 or 4 and $I_{6.1}$ will be at infinity on lines normal to the direction of travel of seat frame 6.

By use of concept (4) above, the other instantaneous centres can be established, the most important ones being $I_{7.1}$, $I_{7.2}$, $I_{7.3}$, $I_{7.4}$, $I_{7.5}$ and $I_{7.6}$.

It will be appreciated from this that if the thigh represented by link 7 can be supported on at least two parts of the suspension (including the base part) at the respective instantaneous centres of rotation of the link 7 relative to such parts, the thigh or link 7 will move as a link of the suspension mechanism in such a way that no displacement of the ankle point A will occur, since point A is a fixed point by definition in establishing the instantaneous centres.

Since the thigh 7 can only be supported relative to the parts of the suspension by supporting it on a seat rest, reference will now be made to FIGS. 2 and 3 which illustrate a practical form of seat constructed in accordance with the teaching of the present invention.

Reference has already been made to the base part 1, links 2, 3, roller or slider members 4, 5, and seat frame 6. The seat part is seen to consist of the seat frame 6 together with the seat rest 10 and back rest 11, back rest 11 being supported on frame 6. The seat rest 10 consists of a pan or frame 12 covered by a seat cushion 13, and back rest 11 consists of a back pan 14 and back cushion 15.

The spring means for supporting the seat part 6, 10, 11 on the base part 1 is a torsion bar 17 extending within a tube 18 to which the upper rearward end of each link 3 is secured. The tube 18 is journalled at its ends in the seat frame 6. One end of bar 17 is secured to one end of tube 18 and the opposite end of bar 17 is connected to the frame 6 via a preload adjustment mechanism (not shown). Manual operation of this mechanism by the seat occupant enables the preload in the torsion bar 17 to be varied.

Since the scissor action links 2, 3 provide for vertical upward and downward movement of the seat frame 6, the back rest 11 can be mounted directly on the seat frame 6 to achieve its desired upward and downward movement at a constant inclination to the vertical.

Since however the seat rest 10 supports the thigh 7, it is required, in accordance with the invention that the seat rest shall be supported at at least two of the points $I_{7.1}$ to $I_{7.6}$. Since $I_{7.1}$ is close to the knee axis K this is an inconvenient centre at which to actually support the seat rest. Among the most convenient instantaneous centres for this purpose are $I_{7.2}$, $I_{7.3}$ and $I_{7.6}$.

The support between the thigh 7 and link 2 is provided by a pivotal connection 20 at $I_{7.2}$ between the seat pan 12 and link 2. Since however $I_{7.3}$ is at a relatively long distance from the seat, pivotal movement of the seat pan 12 about $I_{7.3}$ is simulated by mounting a plate 21 on link 3, the plate 21 being part cylindrical about a horizontal axis through $I_{7.3}$, and mounting a roller 22 on seat pan 12 to roll on plate 21.

An even more convenient pair of centres are $I_{7.2}$ and $I_{7.6}$. Mounting of the seat pan for movement about $I_{7.6}$ is simulated, as seen in the fragmentary illustration in FIG. 2A, by causing roller 22 to roll on a plate 23 fixed directly to the seat frame 6 and curved about the horizontal axis through $I_{7.6}$.

Alternatively, the seat pan 12 could be positively supported on the transverse horizontal axis through $I_{7.6}$ by providing arms (as in FIGS. 6 and 10) connected to and projecting from seat frame 6 and seat pan 12 alongside the seat occupant, the respective arms being interconnected by pivots on the said transverse axis through $I_{7.6}$. The connections from the arms to the seat frame 6 and seat pan 12 will be such as to support the seat pan on the seat frame.

Figure 3:
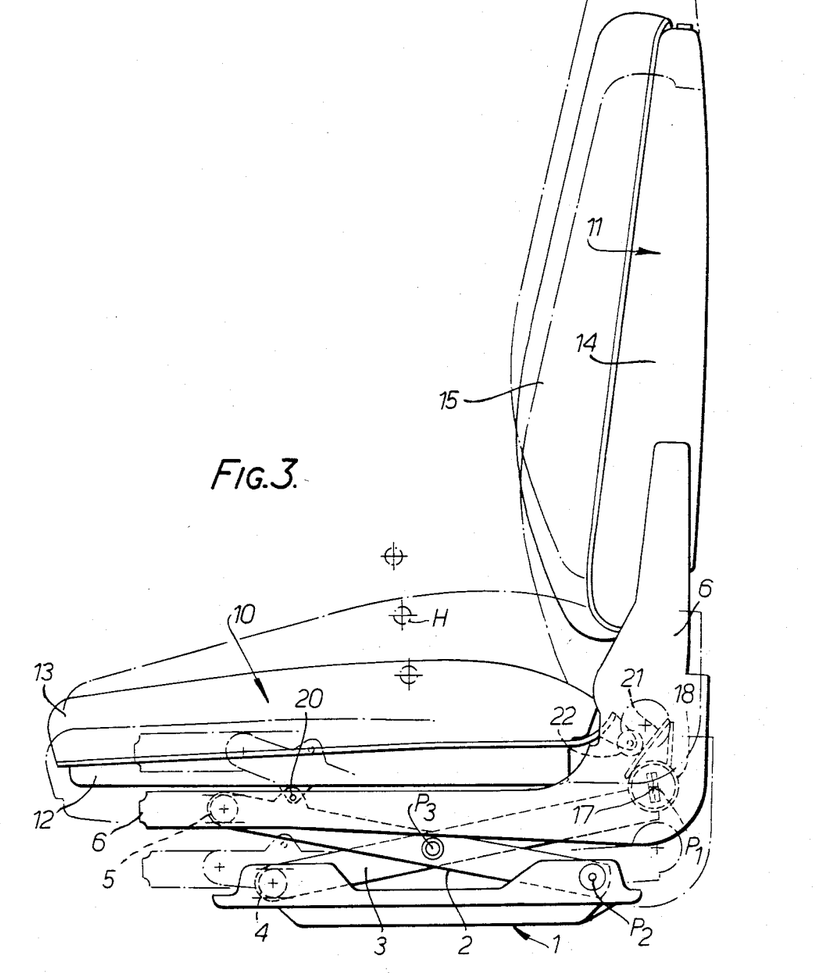
FIG. 3 is a diagrammatic representation of the movement of the vehicle seat of FIG. 2.

The manner in which the seat rest moves when supported at $I_{7.2}$ and $I_{7.3}$ is illustrated in FIG. 3, the full line of the seat part corresponding to the mid-ride position, and the UP- and DOWN-stop positions being shown in chain-dotted lines.

Figure 2:
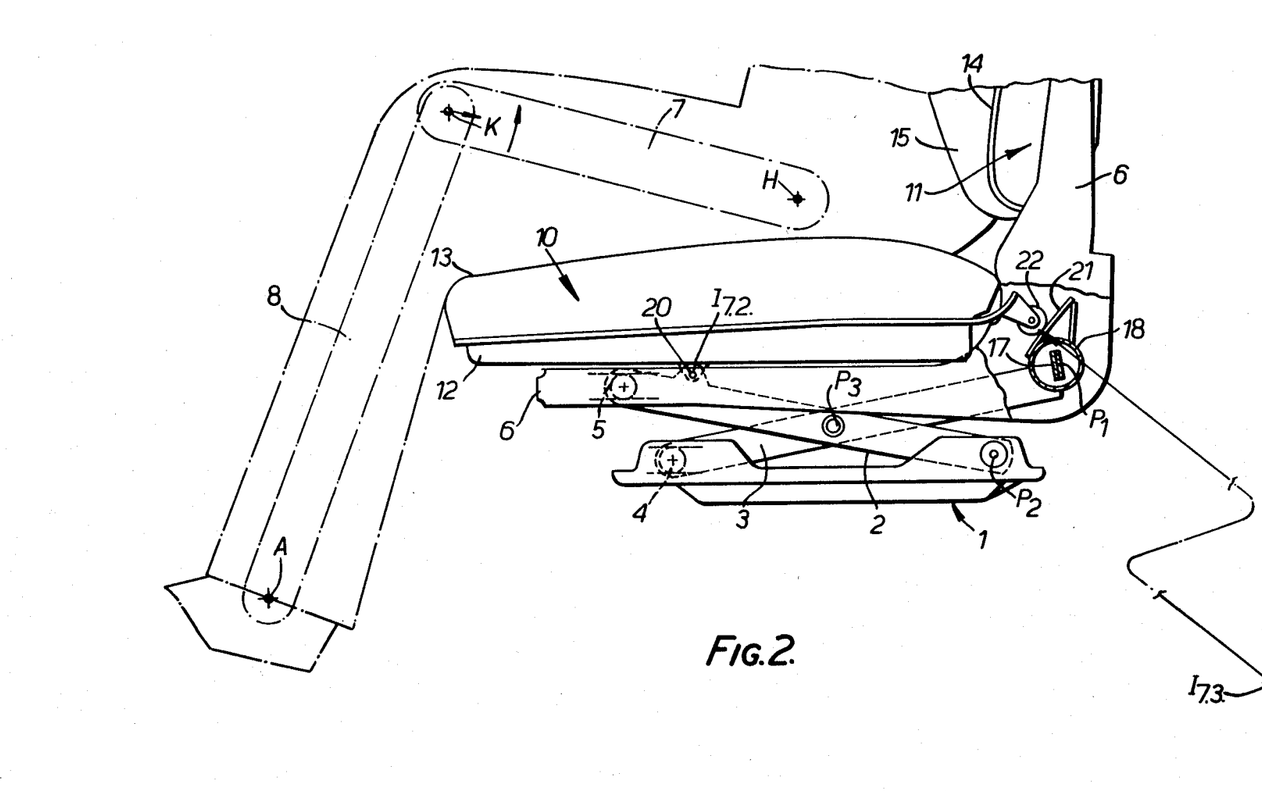
FIG. 2 is a diagrammatic side elevation, part sectional, of a vehicle seat constructed in accordance with the invention.
Figure 2A:
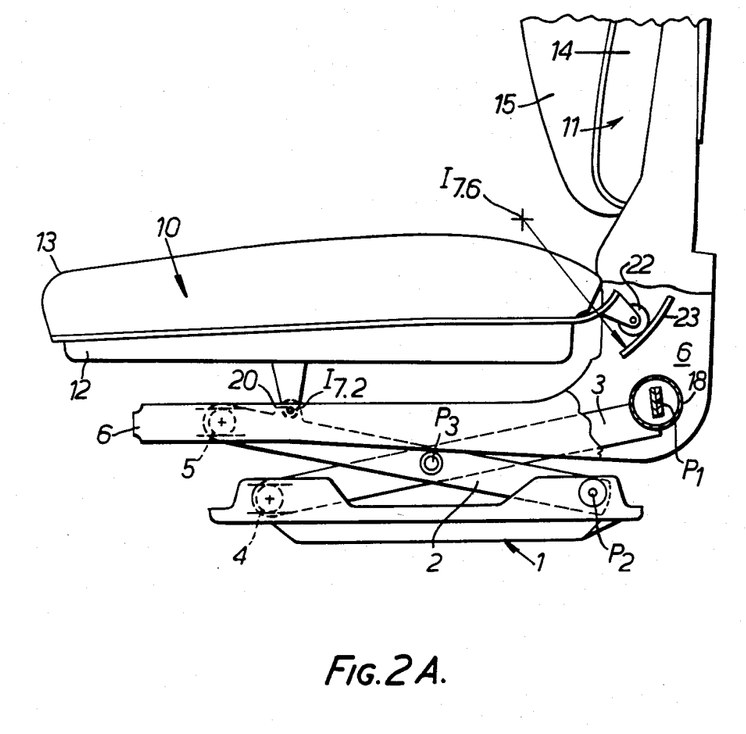
FIG. 2A shows a modification of the vehicle seat of FIG. 2 which involves a different instantaneous centre of rotation.

In the description which follows, reference numerals 1 to 8 will be retained so far as possible to represent the same type of parts shown in FIG. 2 in spite of minor variations in the shape and function of the parts, in order to avoid the confusion which would occur from the adoption of different references. References 2 and 3 will denote any two links by means of which the seat part is mounted on the base part.

Figure 4:
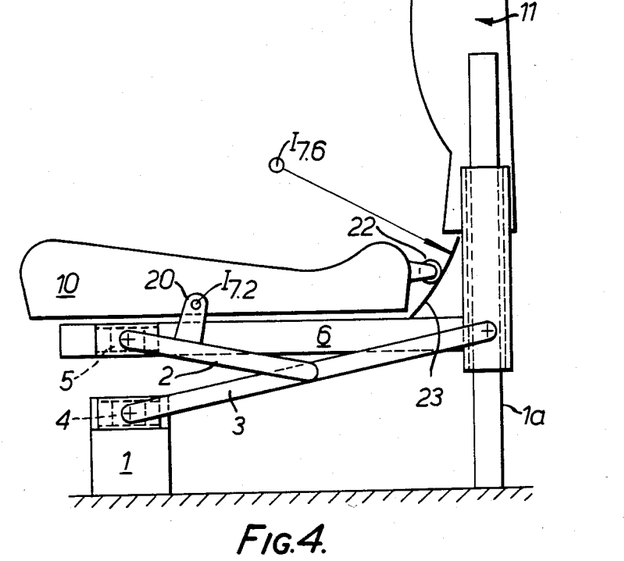
FIGS. 4 and 5 are diagrammatic illustrations of the combination respectively of the seat rest mounting of FIG. 2A with other types of suspension.

Thus in FIG. 4 there is shown, in skeleton form, a type B suspension in which the back rest 11 is guided for vertical movement by sliding on a vertical rod 1a forming part of the base part 1, and the seat rest 10 is supported by links 2 and 3 of a modified type A suspension. Since the links 2 and 3 are no longer required to maintain the vertical movement of the seat, the type A suspension has been modified by omitting the lower rearward half of link 2. Alternatively the link 3 could have been omitted, (as in FIG. 8). The seat rest 10 in this case is supported, as in FIG. 2A, at the instantaneous centres of rotation $I_{7.2}$ and $I_{7.6}$.

Figure 5:
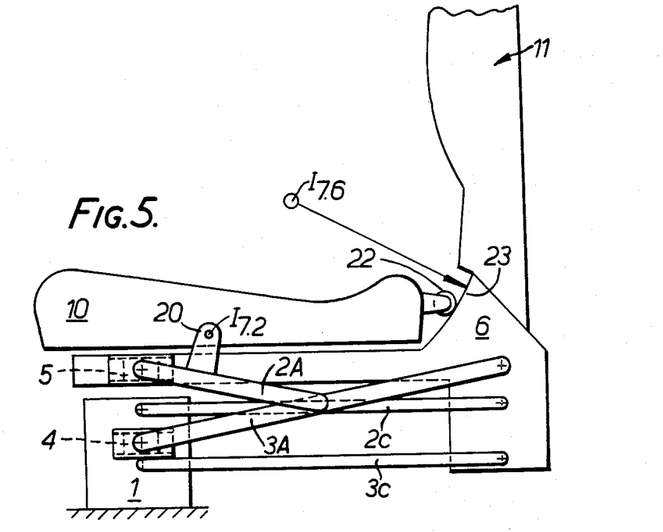

FIG. 5 illustrates a modification of the seat suspension of FIG. 4 in that the type B suspension has been replaced by a type C suspension. In this case, the links of the modified type A suspension on which the seat rest is supported are indicated by references 2A, 3A. The links of the type C suspension by which the seat frame 6 is mounted on the base 1 are indicated by references 2C and 3C.

Figure 6:
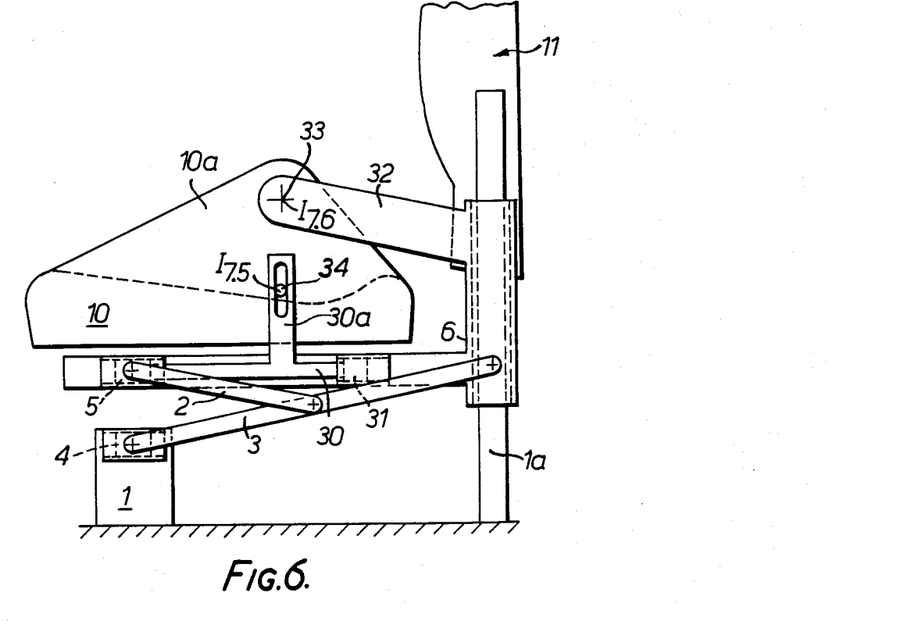
FIGS. 6 to 11, are diagrammatic illustrations of suspensions in which the seat rest is pivoted about a pair of instantaneous centres of rotation different from that of FIG. 2.

FIG. 6 shows in skeleton form a modified type A suspension on which the seat part 10 is supported at instantaneous centres of rotation $I_{7.5}$ and $I_{7.6}$. The support at $I_{7.5}$ is achieved by providing a rigid link 30 connecting slider or roller 5 to a slider or roller 31 movable in a horizontal guide on the seat frame 6 and a part 30a upstanding from link 30 having a pivotal and sliding connection at point $I_{7.5}$ to the seat part 10. A rigid link 32 rigidly connected to the seat frame 6 extends therefrom to a pivot connection 33 on an upstanding side member 10a of the seat part 10 at $I_{7.6}$. Alternatively, instead of allowing link 30a to slide relative to pivot 34, the link 32 could be pivoted to seat frame 6 instead of being rigidly fixed. As shown a type B suspension is used to maintain the vertical movement of the seat frame 6. Alternatively, the vertical movement could be achieved by converting the modified type A suspension, on which the seat part 10 is supported, to a full type A suspension.

Figure 7:
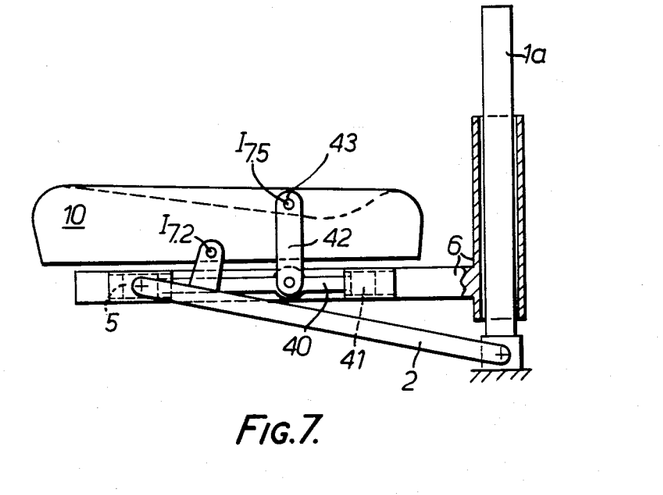

FIG. 7 is a diagrammatic view, in skeleton form, of a modified type A suspension supporting a seat rest 10, with a type B suspension supporting the back rest, and in which the seat rest 10 is pivoted at $I_{7.2}$ and $I_{7.5}$. The pivot connection at $I_{7.2}$ is achieved as shown in FIG. 2. The $I_{7.5}$ connection however is provided by a rigid link 40 connected between slider or roller 5 and a slider or roller 41 both moving in horizontal guides on frame 6, with a link 42, pivotally connected to and upstanding from link 40, the link 42 having a pivotal connection 43 to the seat rest 10 at $I_{7.5}$.

As an alternative to the modified type A suspension as shown, one could use a different modified type A suspension, for example as in FIG. 6. A full type A suspension could be used for controlling the movement of the back rest.

Figure 8:
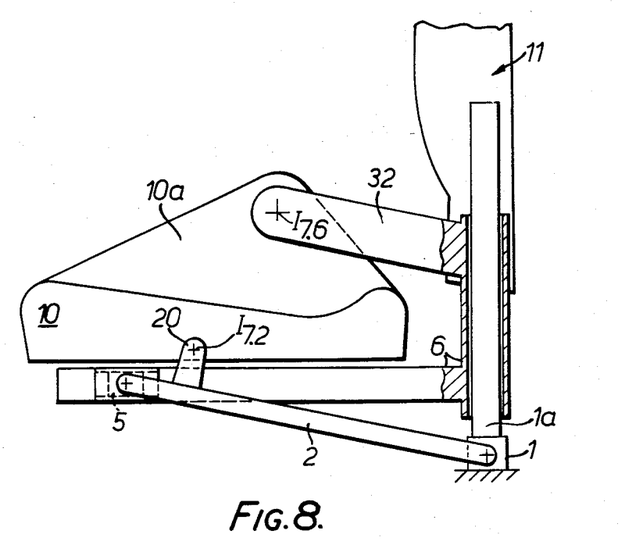

FIG. 8 is a representation, in skeleton form, of a modified type A suspension on which the seat rest 10 is suported at $I_{7.2}$, as described in connection with the embodiment of FIG. 7, and at $I_{7.6}$ as described in connection with the embodiment of FIG. 6.

Figure 9:
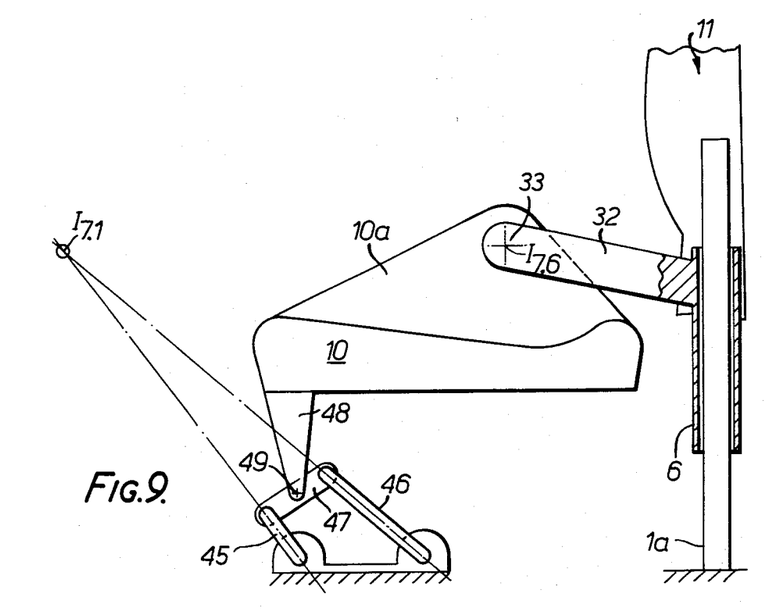

FIG. 9 is a representation, in skeleton form, of a seat part 10 supported at $I_{7.6}$ as in FIG. 8, and also at $I_{7.1}$. In view of the difficulty of providing actual support at the point $I_{7.1}$, the desired effect is achieved by pivotally connecting first and second rods 45, 46, at one end thereof to base part 1 and at their opposite end to a coupling rod 47 such that, as the system of rod 45–47 is moved pivotally a point on the rod 47 moves along an arc of a circle centred at point $I_{7.1}$. An arm 48 rigidly fixed to the underside of the seat part 10 has a pivotal connection 49 to the above mentioned point on rod 47 so that pivotal connection 49 moves instantaneously about centre $I_{7.1}$.

Figure 10:
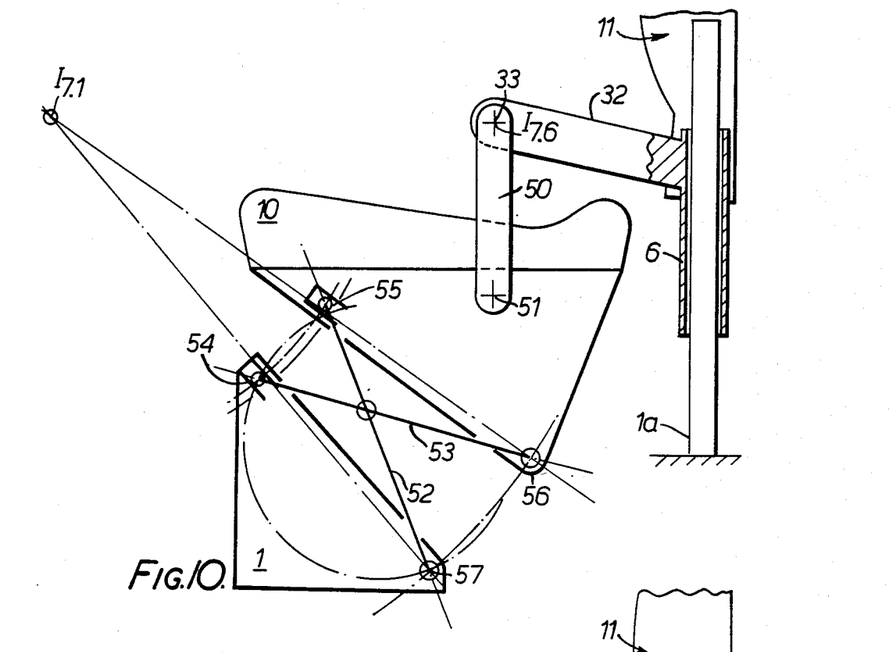

FIG. 10 is a representation, in skeleton form, of a seat part 10 supported at $I_{7.6}$ and at $I_{7.1}$ by means different from those shown in FIG. 9. In the present case, the support at $I_{7.6}$ differs from that of FIG. 9 in that a swinging link 50 depends from pivot connection 33 to a pivot connection 51 on the seat part 10. The support at $I_{7.1}$ is provided by an assymetric scissor-action linkage in which links 52, 53 of the linkage have roller connections 54, 55 on the base 1 and seat part 10 respectively, and fixed pivot connections 56, 57 on the seat part 10 and base part 1 respectively.

Figure 11:
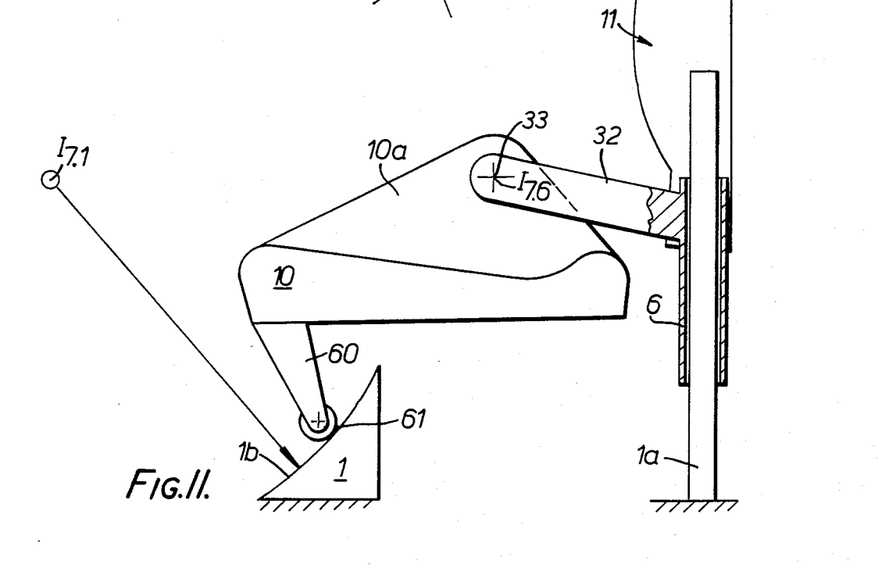

FIG. 11 is a representation, in skeleton form, of a seat part 10 supported at $I_{7.6}$ as in FIGS. 8 and 9, and at $I_{7.1}$. In this case, the support $I_{7.1}$ is provided by an arm 60 rigidly fixed to the seat part 10 and carrying a roller 61 at its lower end, the roller rolling on a part-cyclindrical surface 1b on base 1, the surface 1b being arcuate about a horizontal axis through $I_{7.1}$.

Figures 12, 13:
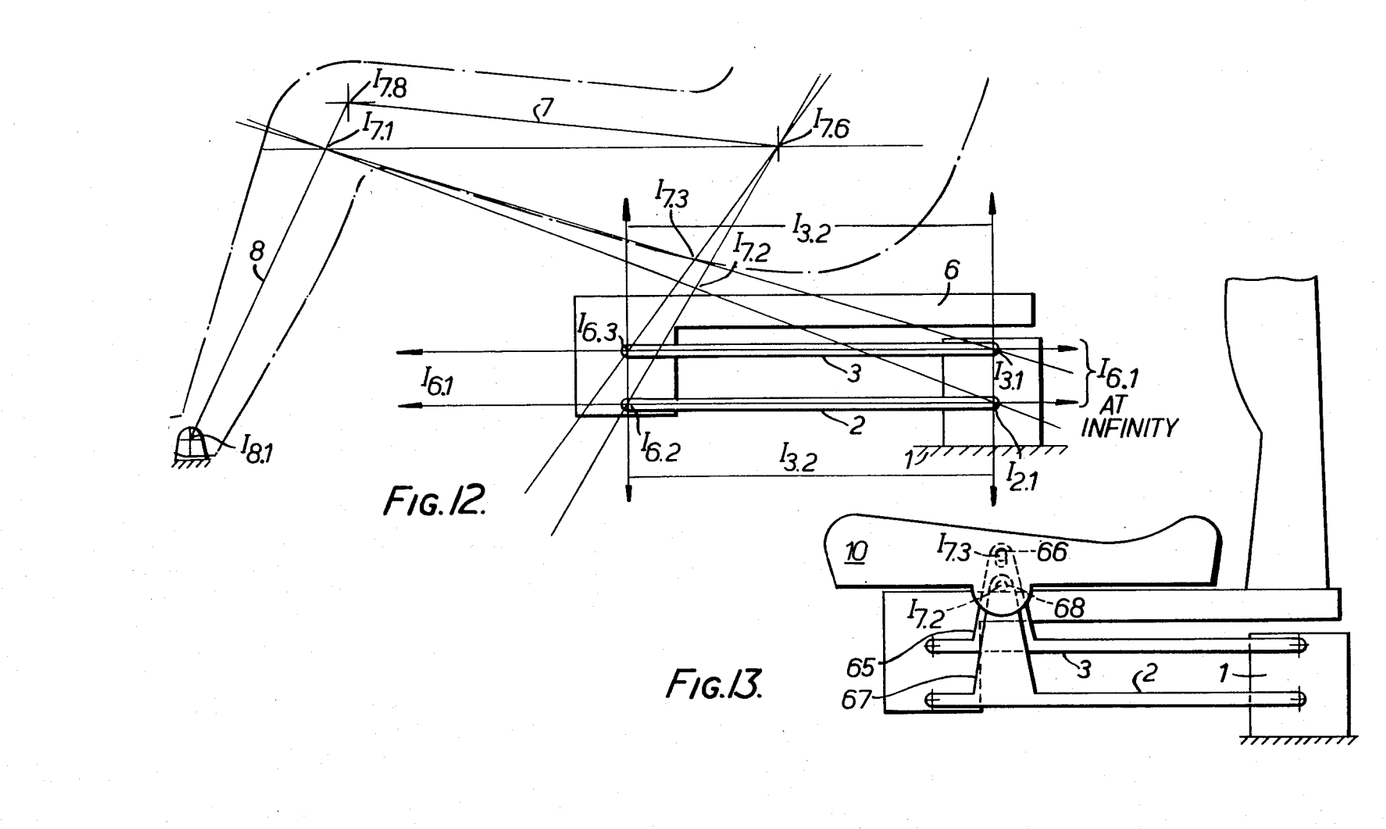
FIG. 12 is a diagrammatic representation, corresponding to that of FIG. 1, of the instantaneous centres of rotation of the parts of another type of suspension.
FIG. 13 is a diagrammatic representation of a seat suspension in which the seat rest is pivoted at instantaneous centres of rotation shown in FIG. 12.

FIG. 12 shows diagrammatically a type C suspension on which a seat frame 6 is supported for vertical movement relative to a base 1 by two parallel links 2, 3 pivoted at their opposite ends to frame 6 and base 1. By the same method as was used in relation to FIG. 1, the instantaneous centres of rotation of the thigh 7 of the seat occupant to parts 1, 2 and 6 have been plotted to provide four centres $I_{7.1}$, $I_{7.2}$, $I_{7.3}$ and $I_{7.6}$ at any two of which a seat rest could be pivoted.

FIG. 13 shows diagrammatically a type C suspension in accordance with the teachings of FIG. 12, in which an arm 65 upstanding from link 3 has a pivotal connection 66 at $I_{7.3}$ with the seat part 10. A further arm 67 upstanding from link 2 has a pivotal connection 68 at $I_{7.2}$ with the seat part 10. The pivotal connection 66 (as shown) or 68 may need to be received in a slot in the associated arm to permit some freedom for relative translational movement between connections 66 and 68.

If the two instantaneous centres of rotation selected as pivot axes of the seat rest do not at all times provide stable support for the seat rest, the latter can be supported at one or more further instantaneous centres of rotation. For example, two separate arcuate surface and roller connections at the front and rear of the seat part could be provided to permit rotation of the seat part about centre $I_{7.6}$.

The description and teaching of the invention given above will enable those skilled in the art to devise many other alternative embodiments within the scope of the invention, and these various supporting means can be combined together in many different ways which will equally be apparent to those skilled in the art.

What is claimed is:

1. A suspended vehicle seat for providing isolation from vertical vibrations to an occupant thereof comprising a seat part, which includes a seat rest (10) which is mounted for tilting movement and a back rest (11), a base part (1), and means connecting the seat part to the base part, said means comprising a spring suspension by which the back rest is supported on the base part and which is effective to restrict movement of the back rest to a substantially vertical direction, the suspension including a spring and a plurality of relatively movable structural elements, certain of said elements connecting to the seat rest and to the back rest for providing pivotal movement of the seat rest about at least two spaced apart horizontal transverse axes through instantaneous centres of rotation, said centres being the instantaneous centres of rotation of the thigh (7) of a seat occupant for whom the seat is designed which is positioned on the seat rest relative to any two of said structural elements of the seat which move relative to each other during upward and downward movement of the seat part relative to the base part, said pivotal movement of the seat rest causing the thigh of a seat occupant to remain in contact with the seat rest and to be movable longitudinally and pivotally in such a way that the ankle hinge axis of the seat occupant will remain stationary relative to the base part as the seat moves above and below its mid-ride position in response to vertical vibrations.

2. A vehicle seat according to claim 1 wherein the seat part includes a seat frame (6), the back rest being mounted on the seat frame, and the elements connecting the seat frame (6) to the base part (1) comprise a pair of pivotally-interconnected links (2, 3) of which link (2) has a displaceable connection (5) with the seat frame and link (3) has a displaceable connection (4) with the base part, one of said links extending between and being pivotally connected at its opposite ends to the seat frame and the base part, one of said connections being said displaceable connection, and wherein the means connecting said seat rest to said back rest permit rotation of the seat rest about one of the following pairs of instantaneous centres, namely $I_{7.1}$ and $I_{7.2}$, $I_{7.2}$ and $I_{7.3}$, $I_{7.3}$ and $I_{7.4}$, $I_{7.1}$ and $I_{7.3}$, $I_{7.2}$ and $I_{7.4}$, $I_{7.3}$ and $I_{7.5}$, $I_{7.1}$ and $I_{7.4}$, $I_{7.2}$ and $I_{7.5}$, $I_{7.3}$ and $I_{7.6}$, $I_{7.1}$ and $I_{7.5}$, $I_{7.2}$ and $I_{7.6}$, $I_{7.4}$ and $I_{7.5}$, $I_{7.1}$ and $I_{7.6}$, $I_{7.4}$ and $I_{7.6}$, or $I_{7.5}$ and $I_{7.6}$.

3. A vehicle seat according to claim 2 wherein both of said links extend between said seat frame and base part and form the means whereby the back rest is guided for vertical movement.

4. A vehicle seat according to claim 2 or claim 3 wherein, for rotation of the seat rest about centre $I_{7.6}$ or $I_{7.3}$, a roller is mounted on said seat rest, a cam surface is mounted on seat frame (6) or link (3) and is arcuate about the respective centre, and said roller engages said cam surface.

5. A vehicle seat according to claim 1 wherein the seat part includes a seat frame (6) the back rest being mounted on said seat frame (6), and the elements connecting the seat frame (6) to the base part (1) include a link (for example 2) extending between and being pivotally connected at its opposite ends to the seat frame (6) and the base part (1), one of said connections being a roller or slider connection (4 or 5), and wherein the elements connecting said seat rest to said back rest permit rotation of the seat rest about one of the following pairs of instantaneous centres, namely: $I_{7.1}$ and $I_{7.2}$, $I_{7.2}$ and $I_{7.4}$, $I_{7.4}$ and $I_{7.5}$, $I_{7.1}$ and $I_{7.4}$, $I_{7.2}$ and $I_{7.5}$, $I_{7.4}$ and $I_{7.6}$, $I_{7.1}$ and $I_{7.5}$, $I_{7.2}$ and $I_{7.6}$, $I_{7.5}$ and $I_{7.6}$, $I_{7.1}$ and $I_{7.6}$.

6. A vehicle seat according to claim 2, having a pivotal connection between the seat rest (10) and a member rigid with link (2) which permits rotation of the seat rest about centre $I_{7.2}$.

7. A vehicle seat according to claim 2 wherein said displaceable connection comprises a roller or slider (5), and a link is pivoted at its opposite ends to the seat rest and to the roller or slider (5), which permits rotation of the seat rest about centre $I_{7.5}$.

8. A vehicle seat according to claim 2 having links upstanding from the seat rest, links projecting upwardly from said seat frame or forwardly from the back rest and means pivoting said upstanding links to said upwardly projecting links, whereby rotation of the seat rest about centre $I_{7.6}$ is permitted.

9. A vehicle seat according to claim 1 having a rigid coupling rigidly connected to the seat rest adjacent the front thereof and a cam and roller connection or a system of pivoted linkages connecting said rigid coupling to the base part (1), the centre of the cam surface, or the instantaneous centre of rotation of a link of said system to which the coupling is pivoted, being at the point $I_{7.1}$, whereby rotation of the seat rest about centre $I_{7.1}$ is permitted.

10. A vehicle seat according to claim 1 wherein, if said two transverse axes do not positively locate the seat rest, the seat rest is pivotally supported on a further horizontal transverse axis through a third of said instantaneous centres of rotation.

11. A vehicle seat according to claim 11 wherein said means pivotally connecting the seat pan to the seat suspension comprise a first pivot connection between a forward part of the pan and a point on a first one of said links which point lies at the instantaneous centre of rotation of a link KH (corresponding to the thigh of the seat occupant), joining the K and H axes, relative to said first link, and a cam and cam follower connection between a rearward part of the seat pan and a rearward part of a second said link such that the said rearward part of the seat pan moves as though it were pivoted to the instantaneous centre of rotation of the link KH relative to said second link.

* * * * *